March 18, 1958

F. C. GROSS ET AL 2,827,287

BLANK FEEDER

Filed March 1, 1954

INVENTORS
FRANK C. GROSS
AND JOHN F. DION
BY Chapin & Neal
ATTORNEYS

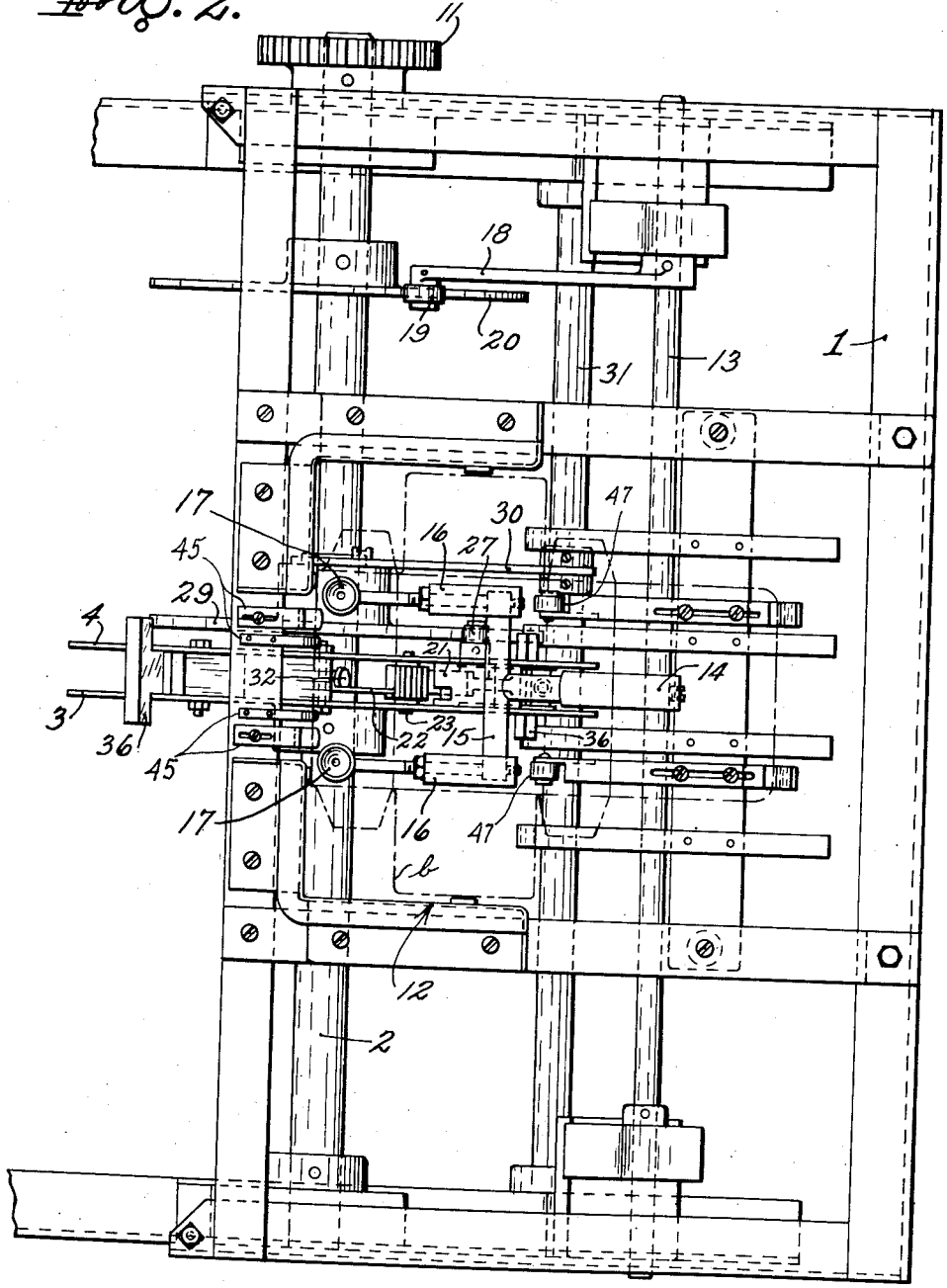

March 18, 1958 F. C. GROSS ET AL 2,827,287
BLANK FEEDER
Filed March 1, 1954
6 Sheets-Sheet 3
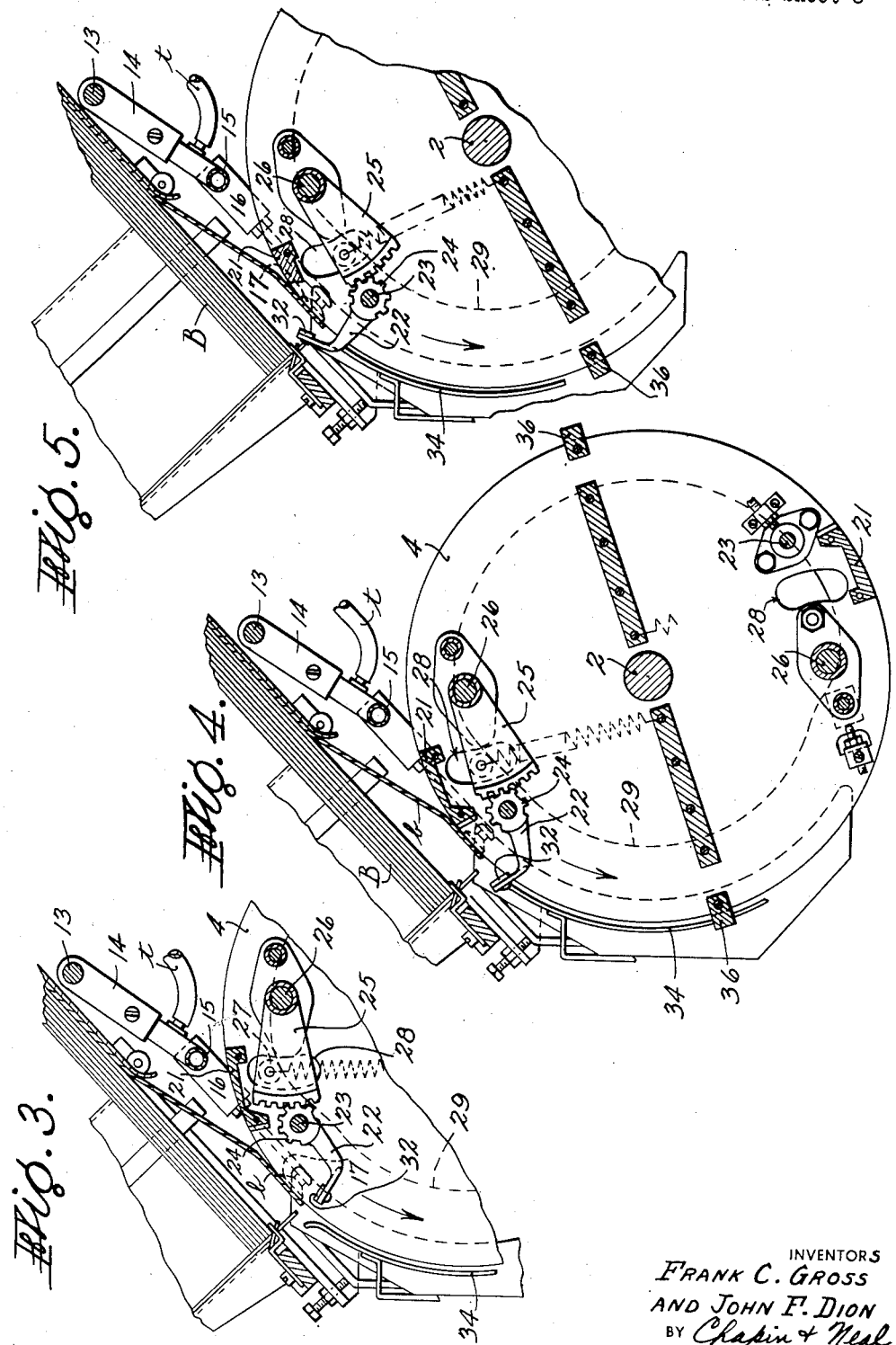
INVENTORS
FRANK C. GROSS
AND JOHN F. DION
BY Chapin + Neal
ATTORNEYS March 18, 1958 F. C. GROSS ET AL 2,827,287
BLANK FEEDER
Filed March 1, 1954 6 Sheets-Sheet 4
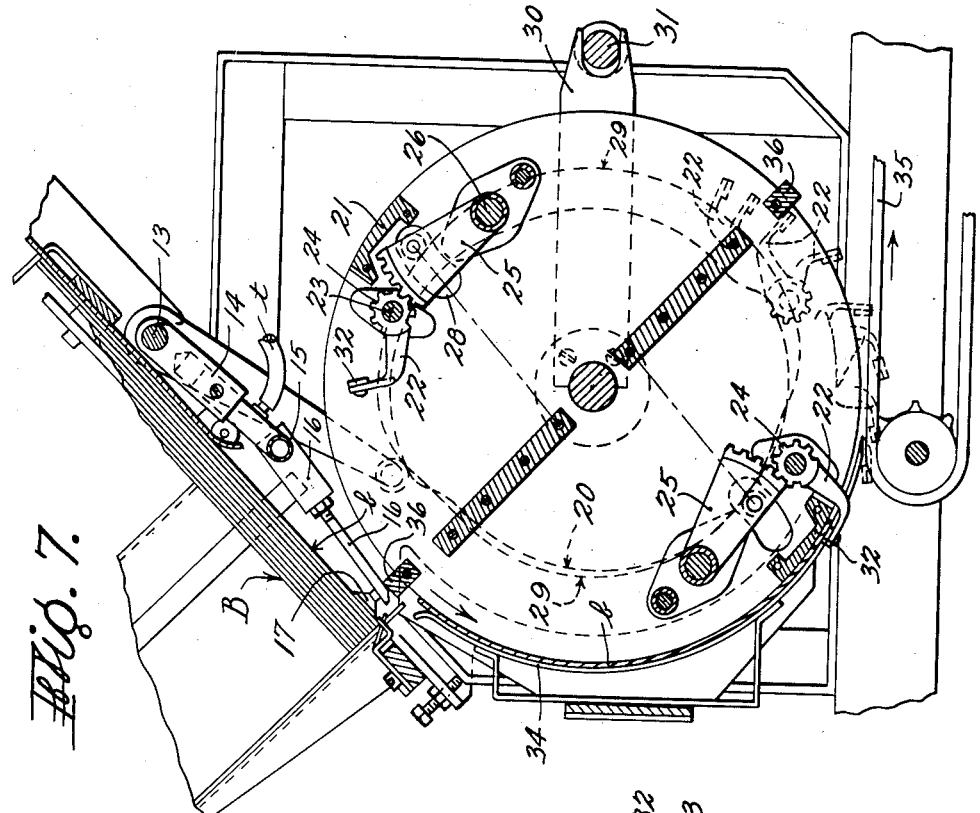
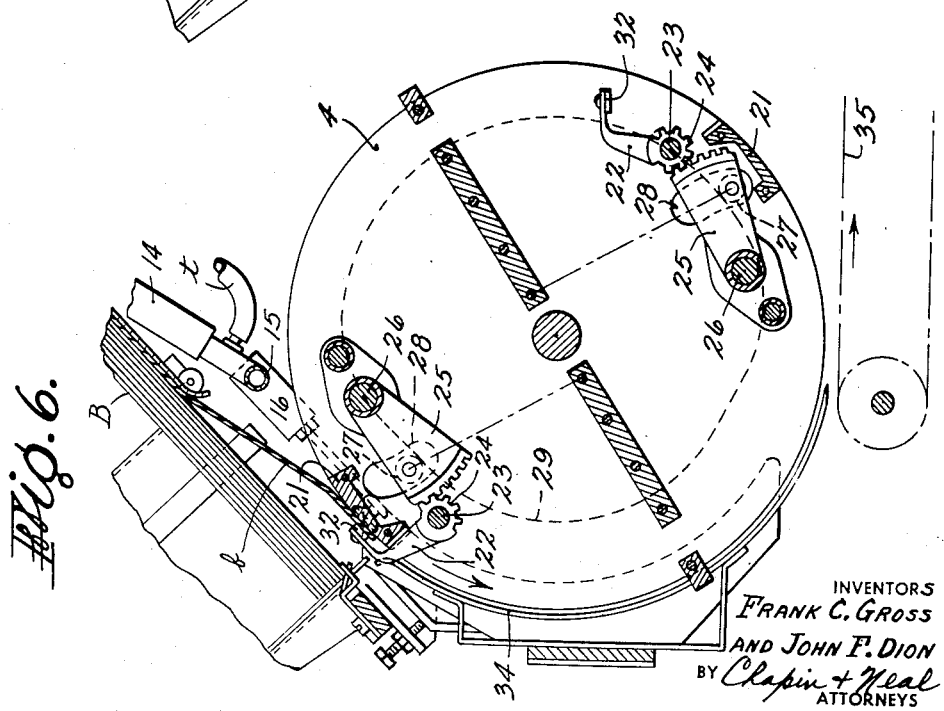
INVENTORS
FRANK C. GROSS
AND JOHN F. DION
BY Chapin + Neal
ATTORNEYS March 18, 1958

F. C. GROSS ET AL 2,827,287

BLANK FEEDER

Filed March 1, 1954

INVENTORS
FRANK C. GROSS
AND JOHN F. DION
BY Chapin + Neal
ATTORNEYS

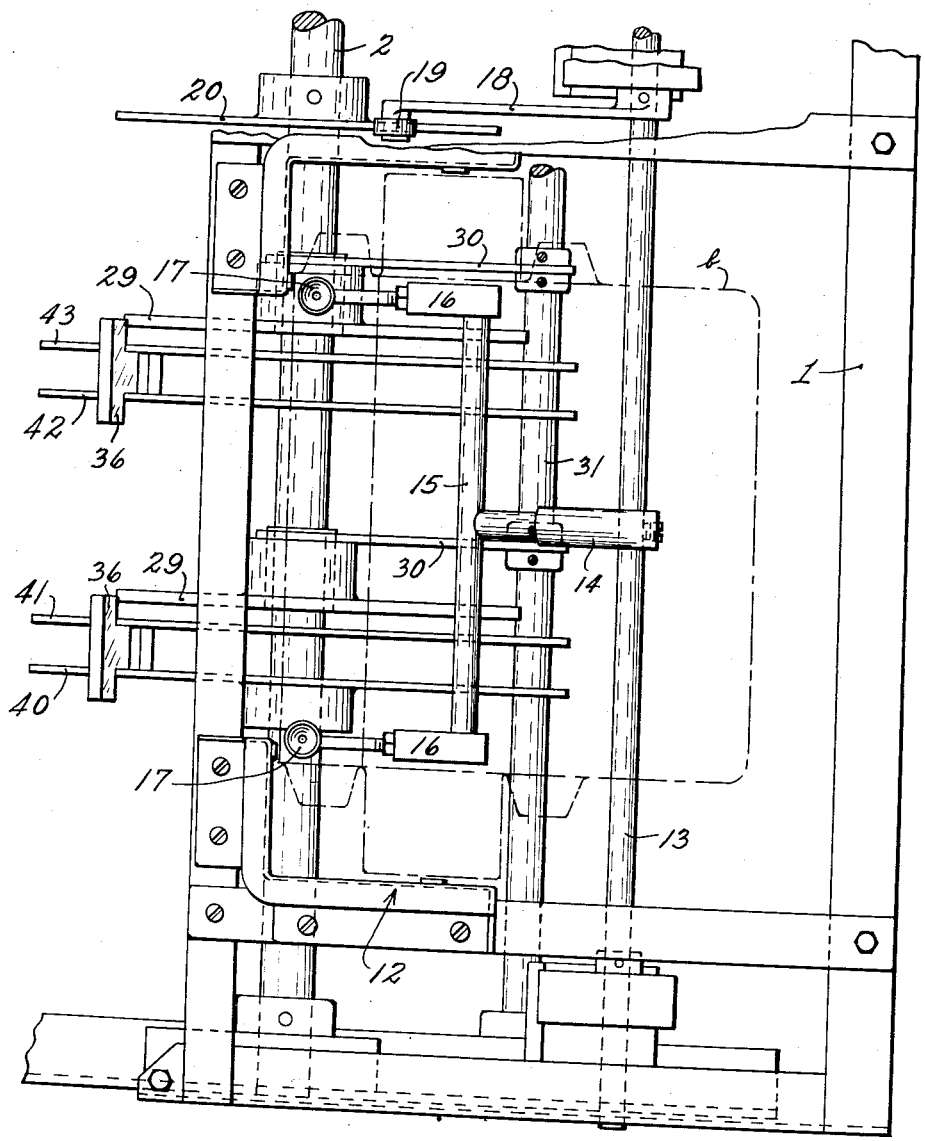

United States Patent Office 2,827,287
Patented Mar. 18, 1958

2,827,287

BLANK FEEDER

Frank C. Gross, Wilbraham, and John F. Dion, East Longmeadow, Mass., assignors to Package Machinery Company, East Longmeadow, Mass., a corporation of Massachusetts Application March 1, 1954, Serial No. 413,104

3 Claims. (Cl. 271—11)

This invention relates to an improvement in blank feeding devices for box or carton forming machines.

It is the principal object of the invention to provide more reliable and faster operating feeding mechanism than has been heretofore available.

Other and futher objects residing in the details of construction will be made apparent in the disclosure of the accompanying drawings and in the following specification and claims.

In the accompanying drawings,

Fig. 2 is a sectional view substantially on line 2—2 of Fig. 1;

Figures 1, 11:
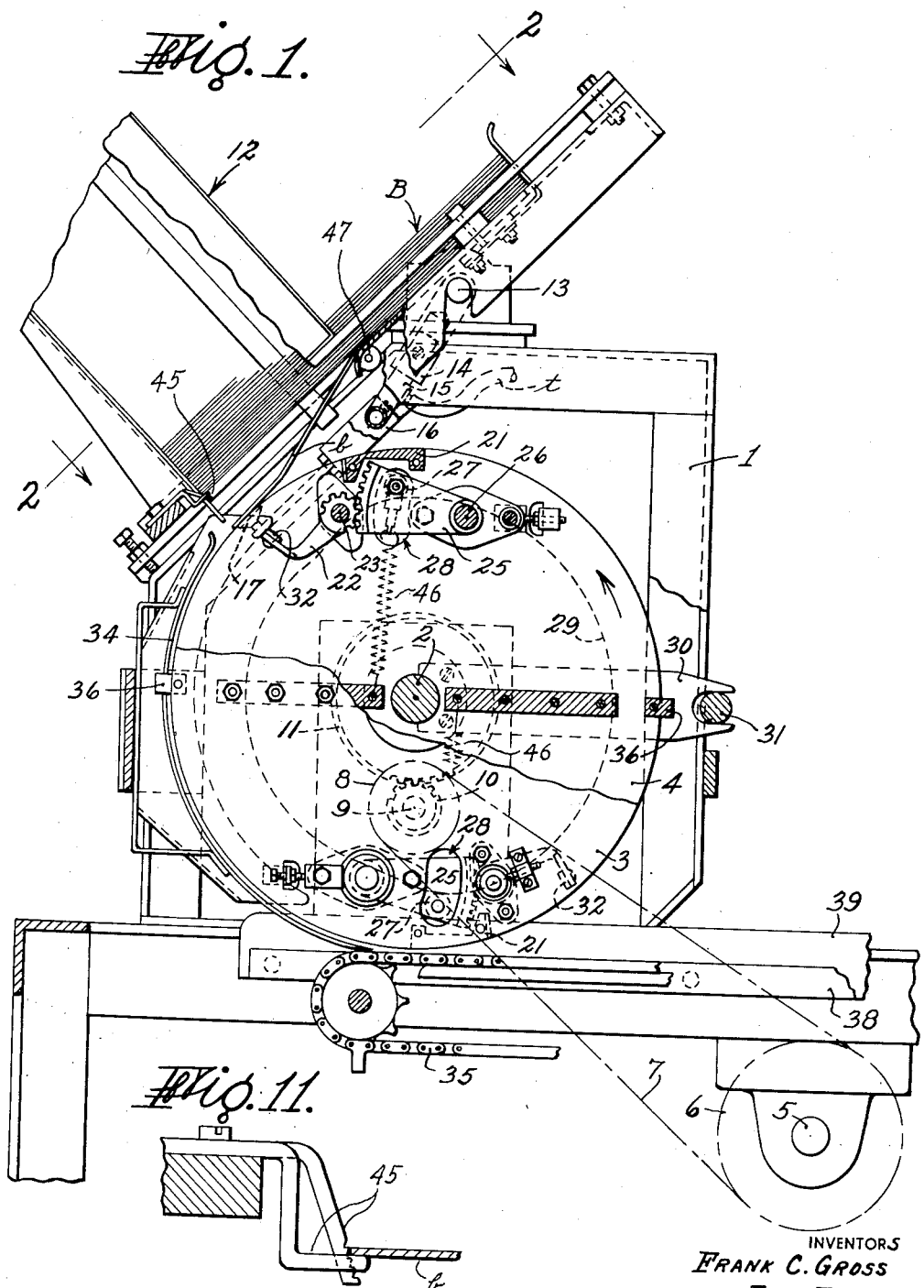
Fig. 1 is a side elevational view of a feeder embodying the invention, parts being broken away and in section.
Figure 9:
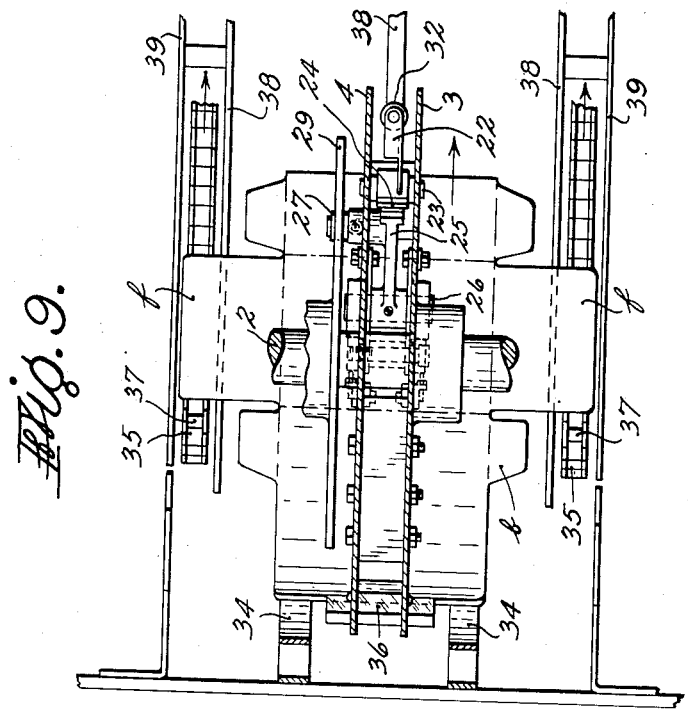
Figure 8:
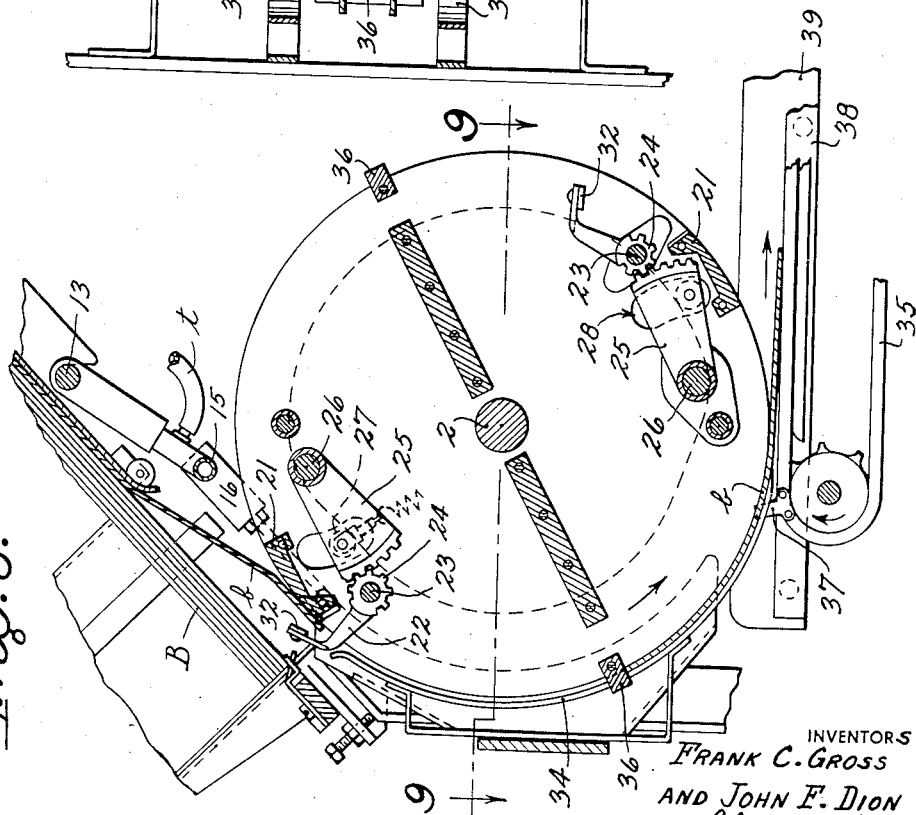

Figs. 3 to 8 inclusive are fragmentary detailed views similar to Fig. 1 but showing the parts in successive feeding positions;

Fig. 9 is a sectional view substantially on line 9—9 of Fig. 8;

Fig. 10 is a view similar to Fig. 2 but showing a modified structure; and

Fig. 11 is a detail view of one of the supports for the leading edge of the blank prior to feeding.

Referring to Figs. 1 and 2, the device is shown as comprising a frame structure generally indicated at 1 which supports a shaft 2 carrying spaced disks 3 and 4. Shaft 2 is constantly driven in the direction of the arrow in Fig. 1 and may be driven in any suitable manner as from a powered shaft 5 of the box machine served by the feeder.

As shown in Fig. 1, a sprocket 6 mounted on the shaft 5 is connected by a chain 7 to a sprocket 8 carried by a stub shaft 9. Shaft 9 is provided with a gear 10 meshing with a gear 11 carried by shaft 2. Mounted on frame 1 is any suitable form of magazine, generally indicated at 12, supporting a stack of blanks B with the lowermost blank b of the stack held in a generally tangential direction but spaced from the peripheral surface of disks 3 and 4, suitable supports 45 being provided to position the leading edge of the lowermost blank in proper position for feeding. Fixed to a rock shaft 13 is an arm 14 carrying a T pipe connection 15, the ends of the cross arms of the T being connected at their ends to hollow arms 16 which terminate in suction cups 17. The arms 16, as best shown in Fig. 2, are positioned outwardly of the disks 3 and 4 and the suction cups 17 are adapted to engage the underface of the lowermost blank b in the stack, as shown in Fig. 7, and withdraw the forward edge thereof from the magazine, as shown in Fig. 3. Suction is applied to the T connection, from any suitable source, by a flexible tube t connected to the stem of the T. Shaft 13 is rocked to swing the arm 14 and suction cups 17 toward and from the stack of blanks by means of an arm 18 (Fig. 2) fixed to shaft 13 and carrying at its free end a cam roll 19 engaging a cam 20 fixed to shaft 2.

Arcuate plates 21 are fixed between the disks 3 and 4 diametrically opposite each other. Associated with each plate 21 (Figs. 2 and 3) is an angular clamping finger 22 pivotally mounted between the disks, and since these clamping fingers and their operating mechanisms are identical a description of one will serve equally for the other.

Referring to Fig. 3, the clamping fingers 22 are pivoted on shafts 23 fixed at their ends to disks 3 and 4. The hubs of fingers 22 are formed with gear teeth 24 which mesh with gear segments 25 pivoted at 26 between the disks. The gear segments are provided with cam rolls 27 which extend through arcuate slots 28 in the disk 4 and engage a cam 29 mounted on shaft 2 and held against rotation thereon by an arm 30 (Fig. 1) having a forked end engaging a rod 31 fixed to the frame. Springs 46 maintain rolls 27 in contact with cam 29. Each shaft 23 is positioned radially inward of and adjacent the leading edge of plate 21 with which it is associated and the end of the finger 22 is provided with a suitable gripping pad 32. As the plate 21 is carried beneath the end of the blank which has been brought into engagement with the periphery of disks 3 and 4 by the suction cups, as shown in Figs. 3, 4 and 5, the gear segment 25 is actuated by cam 29 to swing the finger 22 around the leading edge of plate 21 to clamp the edge of the blank to the plate, as shown in Fig. 6. Upon continued rotation of the disks the clamped blank is stripped from the retreating suction cups and drawn downwardly as shown in Fig. 7, the trailing end of the blank being held against the periphery of the disks 3 and 4 by arcuate guides 34. Preferably antifriction rolls 47 are provided at the bottom of the magazine to facilitate removal of the blank by the suction cups and grippers. The blank is carried by the gripper toward a constantly driven conveyor chain 35. As the leading edge of the blank approaches the ends of the guides 34 the finger 22 is actuated, as shown in dotted lines in Fig. 7, by its cam 29 to release the blank. On release of the blank by the gripper the trailing edge of the blank is engaged by one of a pair of diametrically positioned bars 36 secured between the disks 3 and 4 and projecting from the periphery thereof. Bar 36 pushes the blank along the guides 34 and onto the spaced conveyor chains 35 as shown in Figs. 8 and 9, where it is picked up by one of a plurality of lugs 37 carried by the chains and by which the blank is advanced to the box forming instrumentalities.

As shown in Fig. 9, the conveyor chains 35 are positioned outwardly of the disks 3 and 4 and the lugs 37 engage outwardly extending flaps f of the box blank, the blank riding on guide bars 38 and between side guides 39 which maintain the blanks properly positioned transversely of the conveyors.

As shown in Fig. 8, as one blank is being released by one gripper the diametrically opposed gripper is picking up a succeeding blank from the magazine.

If desired, and as shown in Fig. 10, where larger blanks are being handled, two pairs of disks 40—41 and 42—43 similar in all respects to disks 3 and 4 previously described, may be fixed to the shaft 2, the suction cups 17 being positioned outwardly of the disks 40 and 43. Each of the pairs of disks 40—41 and 42—43 will be provided with the instrumentalities previously described, such as a pusher 36 and grippers 22 (not shown).

What is claimed is:

1. In a machine for supplying blanks to box forming machines and the like, a constantly driven shaft, spaced discs fixed to said shaft, a fixed magazine positioned to support a stack of blanks adjacent the peripheries of the discs, a gripper carried by the discs, means to present the leading edge of the lowermost blank in the magazine to said gripper to be engaged and advanced thereby, fixed arcuate guide members to maintain the blank in approximate contact with the peripheries of the discs as the blank is advanced by the gripper, means to release the blank from the gripper prior to the release of the leading edge of the blank by said guides, and a pusher carried by the discs and engageable with the trailing edge of the blank to discharge the blank from said guides and discs.

2. In a machine for supplying blanks to box forming machines and the like, a constantly driven shaft, a pair of spaced discs fixed to the said shaft, a fixed magazine positioned to support a stack of blanks adjacent the peripheries of the discs, a gripper pivoted to and between the discs, means to present the leading edge of the lowermost blank in the magazine to said gripper to be engaged and advanced thereby, fixed arcuate guide members positioned at opposite sides of the pair of discs and concentric therewith to maintain portions of the blank between the guide members in approximate contact with the peripheries of the discs as the blank is advanced by the gripper, means to release the blank from said gripper prior to the release of the leading edge of the blank by said guides, and a pusher secured to and extending radially from between the discs for engagement with the trailing edge of the blank, upon release of the blank by the gripper, to discharge the blank from said guides and discs.

3. In a machine for supplying blanks to box forming machines and the like, a constantly driven shaft, a pair of spaced discs fixed to said shaft, a gripper means carried by the discs engageable with the leading edge of a blank for advancing it with the discs and a pusher member carried by the discs for advancing the blank, said pusher being circumferentially spaced rearwardly of the gripper a distance slightly greater than the longitudinal dimension of the blank, the peripheral edges of the discs between the gripper means and pusher member being free, fixed arcuate guide members positioned at opposite sides of the pair of discs and concentric therewith to maintain portions of the blank between the guide members in approximate contact with the peripheries of the disc when the blank is advanced by either the gripper or pusher and means to release the blank from the gripper means just prior to the release of the leading edge of the blank from the guides, the pusher member engaging the blank upon the release of the blank by the gripper means to discharge the blank from the guides and discs.

References Cited in the file of this patent
UNITED STATES PATENTS

| | | |
|---|---|---|
| 1,232,662 | De Minico | July 10, 1917 |
| 2,173,118 | Krueher | Sept. 19, 1939 |
| 2,219,608 | Ackley | Oct. 29, 1940 |
| 2,280,731 | Talbot | Apr. 21, 1942 |
| 2,564,417 | Baker et al. | Aug. 14, 1951 |
| 2,687,300 | Chew | Aug. 24, 1954 |